United States Patent
Mitsunaga et al.

(10) Patent No.: US 8,164,513 B2
(45) Date of Patent: *Apr. 24, 2012

(54) PRESENT POSITION LOCATING METHOD

(75) Inventors: Shinichi Mitsunaga, Kanagawa (JP);
Mikio Nagahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 411 days.

This patent is subject to a terminal disclaimer.

(21) Appl. No.: 12/576,873

(22) Filed: Oct. 9, 2009

(65) Prior Publication Data

US 2010/0079335 A1    Apr. 1, 2010

Related U.S. Application Data

(63) Continuation of application No. 12/062,183, filed on Apr. 3, 2008, now Pat. No. 7,623,069.

(30) Foreign Application Priority Data

Apr. 9, 2007   (JP) ................................ 2007-101478
Feb. 19, 2008  (JP) ................................ 2008-037116

(51) Int. Cl.
*G01S 19/42*   (2010.01)
*G01S 19/46*   (2010.01)
*G01S 19/09*   (2010.01)

(52) U.S. Cl. .......... 342/357.25; 342/357.29; 342/357.46

(58) Field of Classification Search ............... 342/357.2, 342/357.25, 357.29, 357.46, 357.67, 357.77; 701/207, 214

See application file for complete search history.

(56) References Cited

U.S. PATENT DOCUMENTS

| | | | |
|---|---|---|---|
| 6,670,916 B2 | 12/2003 | Edwards et al. | |
| 7,292,184 B2 | 11/2007 | Uozumi | |
| 7,623,069 B2 * | 11/2009 | Mitsunaga et al. | 342/357.29 |
| 2003/0156058 A1 | 8/2003 | Edwards et al. | |

FOREIGN PATENT DOCUMENTS

JP   2003-240836 A   8/2003
JP   2006-58200 A    3/2006

* cited by examiner

*Primary Examiner* — Dao Phan
(74) *Attorney, Agent, or Firm* — Global IP Counselors, LLP

(57) ABSTRACT

An evaluation point E of a present position candidate corresponding to each satellite set is calculated based on an a priori residual (APR) (APR value), a PDOP value, and the number of satellites of the target satellite set according to $E = k1 \cdot f1(APR) + k2 \cdot f2(PDOP) + k3 \cdot f3(\text{number of satellites})$. Evaluation coefficients $k1$ to $k3$ for respectively weighting evaluation functions $f1$ to $f3$ are determined based on an APR average value.

5 Claims, 9 Drawing Sheets

FIG. 8A

MULTIPATH ENVIRONMENT

| COMBINATION OF SATELLITES | APR | HORIZONTAL ERROR |
|---|---|---|
| #1, #2, #3, #4, #5, #6 | 14.28 | 79.19903 |
| #1, #2, #3, #4, #5, #6, #7 | 46.18 | 193.6069 |
| #1, #2, #3, #5, #6, #7 | 3.32 | 209.5483 |
| #1, #2, #3, #4, #6, #7 | 24.7 | 203.2641 |
| #1, #2, #4, #5, #6, #7 | 32.16 | 195.4056 |
| #1, #3, #4, #5, #6, #7 | 11.92 | 173.4195 |
| #2, #3, #4, #5, #6, #7 | 27.71 | 252.2096 |
| AVERAGE VALUE | 22.89571 | 186.6647 |

FIG. 8B

OPEN-SKY ENVIRONMENT

| COMBINATION OF SATELLITES | APR | HORIZONTAL ERROR |
|---|---|---|
| #1, #2, #4, #8, #9, #10 | 1 | 13.20679 |
| #1, #2, #4, #6, #8, #9, #10, #11 | 12.72 | 2.764212 |
| #1, #2, #4, #6, #8, #9 | 1.41 | 3.438601 |
| #1, #2, #4, #6, #8, #9, #10 | 9.8 | 2.591725 |
| #1, #2, #4, #6, #8, #11 | 6.16 | 3.832714 |
| #1, #2, #6, #8, #9, #10 | 6.86 | 2.299796 |
| #1, #4, #6, #8, #9, #10 | 2.45 | 2.418698 |
| #1, #2, #4, #8, #9, #10, #11 | 6.32 | 11.95278 |
| #1, #2, #4, #8, #10, #11 | 4.36 | 12.47032 |
| #1, #2, #8, #9, #10, #11 | 4.36 | 12.66579 |
| #1, #4, #8, #9, #10, #11 | 2.24 | 4.786634 |
| #1, #2, #4, #6, #8, #11 | 6.4 | 1.559763 |
| #1, #2, #4, #6, #8, #9, #11 | 8.94 | 1.506658 |
| #1, #2, #6, #8, #9, #11 | 6.4 | 1.493639 |
| #1, #4, #6, #8, #9, #11 | 2.45 | 1.734093 |
| #1, #2, #6, #8, #10, #11 | 6.56 | 2.497851 |
| #1, #2, #4, #6, #8, #10, #11 | 10.2 | 2.615496 |
| #1, #4, #6, #8, #10, #11 | 1 | 1.775828 |
| #1, #6, #8, #9, #10, #11 | 0 | 2.414657 |
| #1, #2, #6, #8, #9, #10, #11 | 10.4 | 2.26602 |
| AVERAGE VALUE | 5.239524 | 5.918777 |

FIG. 9
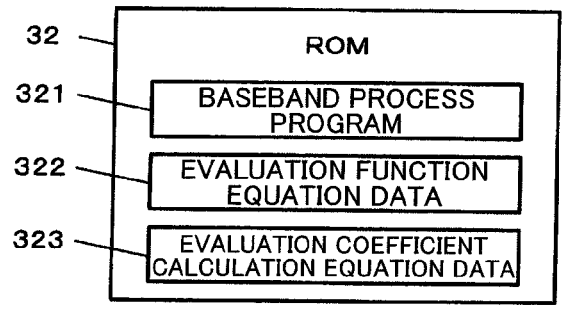
FIG. 10
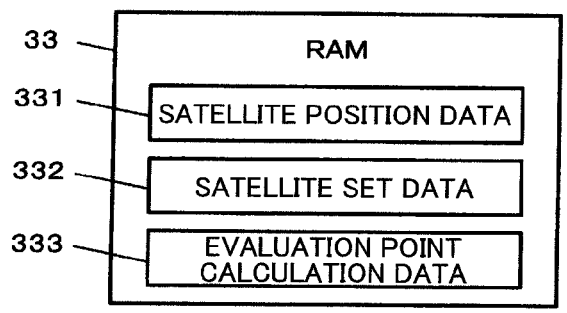
FIG. 11
SATELLITE POSITION DATA
| GPS SATELLITE | POSITION |
|---|---|
| #1 | $(X_1, Y_1, Z_1)$ |
| #2 | $(X_2, Y_2, Z_2)$ |
| ⋮ | ⋮ |

FIG. 12

SATELLITE SET DATA 332

| SATELLITE SET | GPS SATELLITE | NUMBER OF SATELLITES | PRESENT POSITION CANDIDATE | APR VALUE | PDOP VALUE | EVALUATION POINT |
|---|---|---|---|---|---|---|
| A | #1, #2, #3, #4, #5, #6 | 6 | $(x_1, y_1, z_1)$ | 12.1 | 2.5 | 0.8 |
| B | #1, #2, #3, #4, #6, #7, #8 | 7 | $(x_2, y_2, z_2)$ | 33.5 | 1.9 | 1.2 |
| C | #2, #3, #4, #5, #6, #7, #9 | 7 | $(x_3, y_3, z_3)$ | 26.7 | 4.5 | 2.9 |
| ... | ... | ... | ... | ... | ... | ... |

FIG. 13

| | 333 | |
|---|---|---|
| | EVALUATION POINT CALCULATION DATA | |
| 333a | APR AVERAGE VALUE | 38.75 |
| 333b | EVALUATION COEFFICIENT k1 | 2.1 |
| 333c | EVALUATION COEFFICIENT k2 | 1.5 |
| 333d | EVALUATION COEFFICIENT k3 | 2.6 |

PRESENT POSITION LOCATING METHOD

CROSS-REFERENCE TO THE RELATED APPLICATIONS

This is a continuation application of U.S. patent application Ser. No. 12/062,183, filed Apr. 3, 2008, now U.S. Pat. No. 7,623,069 which claims priority to Japanese Patent Application No. 2007-101478 filed on Apr. 9, 2007 and Japanese Patent Application No. 2008-37116 filed on Feb. 19, 2008. The entire disclosure of U.S. patent application Ser. No. 12/062,183 and Japanese Patent Application Nos. 2007-101478 and 2008-37116 is hereby incorporated by reference in their entirety.

BACKGROUND OF THE INVENTION

The present invention relates to a present position locating method.

The global positioning system (GPS) is widely known as a satellite positioning system, and is utilized for a car navigation system and the like. In the GPS, GPS satellite signals are respectively transmitted from a plurality of GPS satellites which orbit the earth, and a GPS receiver calculates (locates) its present position based on the received GPS satellite signals.

A GPS satellite signal affected by a multipath or the like may be included in the acquired GPS satellite signals. The term "multipath" refers to a phenomenon in which an indirect wave reflected or diffracted by a building or topography is superimposed on a direct wave from a GPS satellite so that the GPS receiver receives identical radio waves through multiple paths. Such a reception environment is referred to as a multipath environment. The present position of the GPS receiver may not be accurately calculated (located) when using a GPS satellite signal affected by a multipath. Specifically, it is necessary to perform positioning calculations while excluding a GPS satellite signal affected by a multipath or the like from the acquired GPS satellite signals. As a method of determining a GPS satellite signal affected by a multipath or the like, a method using an a priori residual (APR) has been known (see JP-A-2003-240836, for example).

The GPS receiver generally calculates its position as follows. Specifically, the GPS receiver selects satellite sets (i.e., combinations of four or more GPS satellites) based on the acquired GPS satellite signals, and performs positioning calculations corresponding to each satellite set to calculate a present position candidate. The GPS receiver selects the present position candidate considered to have the highest accuracy from the present position candidates calculated corresponding to the respective satellite sets based on an index such as a position dilution of precision (PDOP), and determines the selected present position to be the present positioning result. The PDOP is disclosed in JP-A-2006-058200, for example.

However, a plurality of GPS satellite signals may be affected by a multipath in a reception environment (e.g., multipath environment) with poor positioning accuracy. In this case, a GPS satellite with poor accuracy may be included in each satellite set. It is insufficient to merely determine a GPS satellite signal with poor accuracy. Specifically, it is necessary to appropriately determine and select a satellite set which is considered to have higher positioning accuracy.

SUMMARY

According to one aspect of the invention, there is provided a present position locating method comprising:

selecting satellite sets, each of the satellite sets being a combination of satellites used for positioning calculations;

calculating present position candidates corresponding to the respective satellite sets using satellite signals from the satellites included in the respective satellite sets;

calculating APR values of the satellites of the respective satellite sets;

calculating an average value of the APR values of the respective satellite sets;

changing weighting of an evaluation result of an evaluation method used to calculate an evaluation point of the present position candidate corresponding to the average value of the APR values;

calculating the evaluation points of the present position candidates corresponding to the respective satellite sets using the evaluation method; and selecting a present position candidate from the present position candidates corresponding to the respective satellite sets based on the evaluation points, and determining the selected present position candidate to be a present located position.

According to another aspect of the invention, there is provided a present position locating method comprising:

selecting satellite sets, each of the satellite sets being a combination of satellites used for positioning calculations;

calculating present position candidates corresponding to the respective satellite sets using satellite signals from the satellites included in the respective satellite sets;

calculating APR values of the satellites of the respective satellite sets;

calculating an average value of the APR values of the respective satellite sets;

changing an evaluation method used to calculate an evaluation point of the present position candidate corresponding to the average value of the APR values;

calculating the evaluation points of the present position candidates corresponding to the respective satellite sets using the evaluation method; and selecting a present position candidate from the present position candidates corresponding to the respective satellite sets based on the evaluation points, and determining the selected present position candidate to be a present located position.

BRIEF DESCRIPTION OF THE SEVERAL VIEWS OF THE DRAWING

FIGS. 8A and 8B show examples of experimental results.

FIG. 9 is a configuration diagram of a ROM.

FIG. 10 is a configuration diagram of a RAM.

FIG. 11 shows a data configuration example of satellite position data.

FIG. 12 shows a data configuration example of satellite set data.

FIG. 13 shows a data configuration example of evaluation point calculation data.

DETAILED DESCRIPTION OF THE EMBODIMENT

Figure 1:
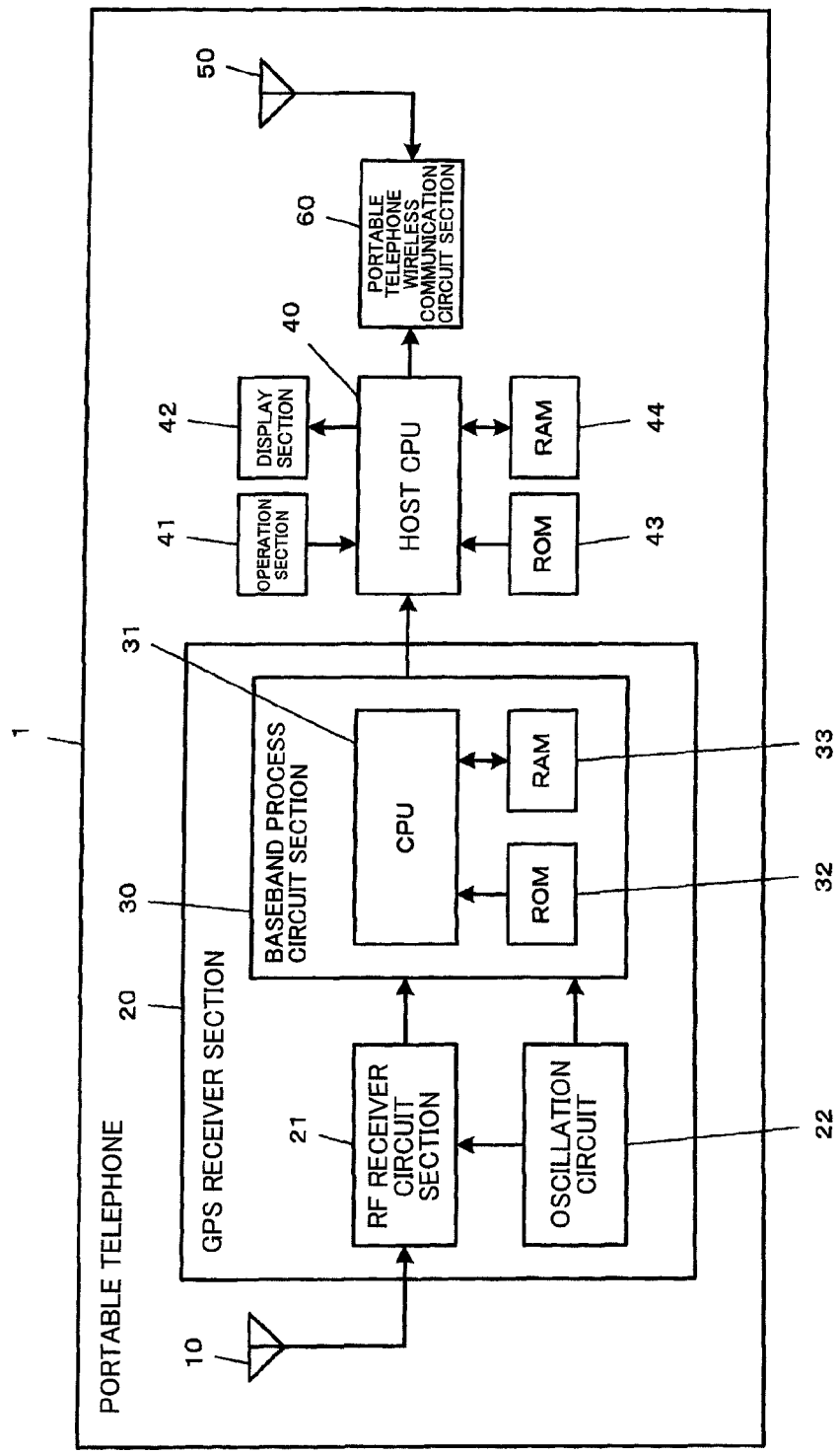
FIG. 1 is an internal configuration diagram of a portable telephone.

Several embodiments of the invention may enable a satellite set with high positioning accuracy to be appropriately determined and selected from a plurality of satellite sets.

According to one embodiment of the invention, there is provided a present position locating method used when receiving satellite signals transmitted from positioning satellites and repeating present position positioning calculations based on the received satellite signals, the method comprising:

selecting satellite sets based on the received satellite signals, each of the satellite sets being a combination of satellites used for present positioning calculations;

calculating present position candidates corresponding to the respective satellite sets using the satellite signals from the satellites included in the respective satellite sets;

calculating APR values of the respective satellite sets, the APR value being the sum of the square of a difference between 1) a pseudo-range and 2) an approximate distance of a target satellite of a target satellite set, the approximate distance being a distance between the target satellite and the present position candidate of the target satellite set;

calculating an average value of the APR values of the respective satellite sets;

changing weighting of an evaluation function of an evaluation point calculation equation used to calculate an evaluation point of the present position candidate corresponding to the average value of the APR values, the evaluation point calculation equation being a composite function of at least one evaluation function selected from 1) an evaluation function with respect to the APR value, 2) an evaluation function with respect to a number of satellites included in the target satellite set, and 3) an evaluation function with respect to a DOP value of the constellation of the satellites included in the target satellite set;

calculating the evaluation points of the present position candidates corresponding to the respective satellite sets using the evaluation point calculation equation; and selecting a present position candidate from the present position candidates corresponding to the respective satellite sets based on the evaluation points, and determining the selected present position candidate to be a present located position.

According to another embodiment of the invention, there is provided a positioning device that receives satellite signals transmitted from positioning satellites and repeats present position positioning calculations based on the received satellite signals, the positioning device comprising:

a satellite set selection section that selects satellite sets based on the received satellite signals, each of the satellite sets being a combination of satellites used for present positioning calculations;

an individual satellite set present position calculation section that calculates present position candidates corresponding to the respective satellite sets using the satellite signals from the satellites included in the respective satellite sets;

an APR value calculation section that calculates APR values of the respective satellite sets, the APR value being the sum of the square of a difference between 1) a pseudo-range and 2) an approximate distance of a target satellite of a target satellite set, the approximate distance being a distance between the target satellite and the present position candidate of the target satellite set;

an average value calculation section that calculates an average value of the APR values of the respective satellite sets;

a weighting change section that changes weighting of an evaluation function of an evaluation point calculation equation used to calculate an evaluation point of the present position candidate corresponding to the average value of the APR values, the evaluation point calculation equation being a composite function of at least one of 1) an evaluation function with respect to the APR value, 2) an evaluation function with respect to a number of satellites included in the target satellite set, and 3) an evaluation function with respect to a DOP value of the constellation of the satellites included in the target satellite set;

an evaluation point calculation section that calculates the evaluation points of the present position candidates corresponding to the respective satellite sets using the evaluation point calculation equation; and a present position determination section that selects a present position candidate from the present position candidates corresponding to the respective satellite sets based on the evaluation points, and determines the selected present position candidate to be a present located position.

According to the above configuration, the present position candidate is calculated corresponding to each satellite set selected based on the received satellite signals. The evaluation point of the present position candidate is calculated using the evaluation point calculation equation, and the present position candidate selected from the present position candidates of the respective satellite sets based on the calculated evaluation points is determined to be the present located position. The evaluation point of each satellite set is calculated using the evaluation point calculation equation that is a composite function of at least one evaluation function selected from 1) the evaluation function with respect to the APR value, 2) the evaluation function with respect to the number of satellites, and 3) the evaluation function with respect to the DOP value. The weighting of each evaluation function of the evaluation point calculation equation is changed corresponding to the average value of the APR values.

The APR value of the satellite set is calculated according to an equation (2) described later based on a pseudo-range ym and an approximate distance yp of each satellite included in the satellite set. The approximate distance yp of each satellite is calculated according to an equation (3) described later based on the position (Xi, Yi, Zi) of that satellite and the present position (x, y, z) calculated based on the satellite signal from each satellite included in the target satellite set.

The APR value and a positioning error generally have a relationship in which the positioning accuracy of the target satellite set decreases as the APR value increases. A satellite signal affected by a multipath or the like is more likely included in the received satellite signals (i.e., multipath environment) as the average value of the APR values increases. Specifically, the evaluation point of each satellite set can be calculated taking the reception environment into consideration (e.g., whether or not the reception environment is a multipath environment) by changing the weighting of each evaluation function corresponding to the average value of the APR values instead of merely using each evaluation function for the target satellite set. Therefore, a present position candidate determined to be the located position can be appropriately selected from the present position candidates corresponding to the selected satellite sets.

According to another embodiment of the invention, there is provided a present position locating method comprising:

selecting satellite sets, each of the satellite sets being a combination of satellites used for positioning calculations;

calculating present position candidates corresponding to the respective satellite sets using satellite signals from the satellites included in the respective satellite sets;

calculating APR values of the satellites of the respective satellite sets;

calculating an average value of the APR values of the respective satellite sets;

changing weighting of an evaluation result of an evaluation method used to calculate an evaluation point of the present position candidate corresponding to the average value of the APR values;

calculating the evaluation points of the present position candidates corresponding to the respective satellite sets using the evaluation method; and selecting a present position candidate from the present position candidates corresponding to the respective satellite sets based on the evaluation points, and determining the selected present position candidate to be a present located position.

According to another embodiment of the invention, there is provided a positioning device comprising:

a satellite set selection section that selects satellite sets, each of the satellite sets being a combination of satellites used for positioning calculations;

an individual satellite set present position calculation section that calculates present position candidates corresponding to the respective satellite sets using satellite signals from the satellites included in the respective satellite sets;

an APR value calculation section that calculates APR values of the respective satellite sets;

an average value calculation section that calculates an average value of the APR values of the respective satellite sets;

a weighting change section that changes weighting of an evaluation result of an evaluation method used to calculate an evaluation point of the present position candidate corresponding to the average value of the APR values;

an evaluation point calculation section that calculates the evaluation points of the present position candidates corresponding to the respective satellite sets using the evaluation method; and a present position determination section that selects a present position candidate from the present position candidates corresponding to the respective satellite sets based on the evaluation points, and determines the selected present position candidate to be a present located position.

In the present position locating method according to this embodiment, the changing of the weighting may include decreasing the weighting as the average value of the APR values increases.

In the positioning device according to this embodiment, the weighting change section may decrease the weighting as the average value of the APR values increases.

According to the above configuration, the weighting of each evaluation function of the evaluation point calculation equation is decreased as the average value of the APR values increases. A satellite signal affected by a multipath or the like is more likely included in the received satellite signals (i.e., multipath environment) as the average value of the APR values increases, as described above. Therefore, the evaluation point of each satellite set can be reduced in the multipath environment as compared with an open-sky environment by decreasing the weighting of each evaluation function of the evaluation point calculation equation as the average value of the APR values increases. Moreover, the evaluation point of the satellite set determined to have poorer positioning accuracy can be reduced by decreasing the weighting of each evaluation function of the evaluation point calculation equation to a different degree so that the present position candidate corresponding to that satellite set is not selected as the located position.

According to another embodiment of the invention, there is provided a present position locating method used when receiving satellite signals transmitted from positioning satellites and repeating present position positioning calculations based on the received satellite signals, the method comprising:

selecting satellite sets based on the received satellite signals, each of the satellite sets being a combination of satellites used for present positioning calculations;

calculating present position candidates corresponding to the respective satellite sets using the satellite signals from the satellites included in the respective satellite sets;

calculating APR values of the respective satellite sets, the APR value being the sum of the square of a difference between 1) a pseudo-range and 2) an approximate distance of a target satellite of a target satellite set, the approximate distance being a distance between the target satellite and the present position candidate of the target satellite set;

calculating an average value of the APR values of the respective satellite sets;

changing weighting of an evaluation point calculation equation used to calculate an evaluation point of the present position candidate corresponding to the average value of the APR values;

calculating the evaluation points of the present position candidates corresponding to the respective satellite sets using the evaluation point calculation equation; and selecting a present position candidate from the present position candidates corresponding to the respective satellite sets based on the evaluation points, and determining the selected present position candidate to be a present located position.

According to another embodiment of the invention, there is provided positioning device that receives satellite signals transmitted from positioning satellites and repeats present position positioning calculations based on the received satellite signals, the positioning device comprising:

a satellite set selection section that selects satellite sets based on the received satellite signals, each of the satellite sets being a combination of satellites used for present positioning calculations;

an individual satellite set present position calculation section that calculates present position candidates corresponding to the respective satellite sets using the satellite signals from the satellites included in the respective satellite sets;

an APR value calculation section that calculates APR values of the respective satellite sets, the APR value being the sum of the square of a difference between 1) a pseudo-range and 2) an approximate distance of a target satellite of a target satellite set, the approximate distance being a distance between the target satellite and the present position candidate of the target satellite set;

an average value calculation section that calculates an average value of the APR values of the respective satellite sets;

an evaluation point calculation equation change section that changes weighting of an evaluation point calculation equation used to calculate an evaluation point of the present position candidate corresponding to the average value of the APR values;

an evaluation point calculation section that calculates the evaluation points of the present position candidates corresponding to the respective satellite sets using the evaluation point calculation equation; and a present position determination section that selects a present position candidate from the present position candidates corresponding to the respective satellite sets based on the evaluation points, and determines the selected present position candidate to be a present located position.

According to the above configuration, the present position candidate is calculated corresponding to each satellite set selected based on the received satellite signals. The evaluation point of the present position candidate is calculated using the evaluation point calculation equation, and the present position candidate selected from the present position candidates of the respective satellite sets based on the calculated evaluation point is determined to be the present located position. In this case, the evaluation point calculation equation is changed corresponding to the average value of the APR values. A satellite signal affected by a multipath or the like is more likely included in the received satellite signals (i.e., multipath environment) as the average value of the APR values increases, as described above. Therefore, the evaluation point of each satellite set can be calculated taking the reception environment into consideration (e.g., whether or not the reception environment is a multipath environment) by utilizing the evaluation point calculation equation corresponding to the average value of the APR values. As a result, a present position candidate determined to be the located position can be appropriately selected from the present position candidates corresponding to the selected satellite sets.

According to another embodiment of the invention, there is provided a present position locating method comprising:

selecting satellite sets, each of the satellite sets being a combination of satellites used for positioning calculations;

calculating present position candidates corresponding to the respective satellite sets using satellite signals from the satellites included in the respective satellite sets;

calculating APR values of the satellites of the respective satellite sets;

calculating an average value of the APR values of the respective satellite sets;

changing an evaluation method used to calculate an evaluation point of the present position candidate corresponding to the average value of the APR values;

calculating the evaluation points of the present position candidates corresponding to the respective satellite sets using the evaluation method; and selecting a present position candidate from the present position candidates corresponding to the respective satellite sets based on the evaluation points, and determining the selected present position candidate to be a present located position.

According to another embodiment of the invention, there is provided a positioning device comprising:

a satellite set selection section that selects satellite sets, each of the satellite sets being a combination of satellites used for positioning calculations;

an individual satellite set present position calculation section that calculates present position candidates corresponding to the respective satellite sets using satellite signals from the satellites included in the respective satellite sets;

an APR value calculation section that calculates APR values of the respective satellite sets;

an average value calculation section that calculates an average value of the APR values of the respective satellite sets;

an evaluation point calculation equation change section that changes an evaluation method used to calculate an evaluation point of the present position candidate corresponding to the average value of the APR values;

an evaluation point calculation section that calculates the evaluation points of the present position candidates corresponding to the respective satellite sets using the evaluation method; and a present position determination section that selects a present position candidate from the present position candidates corresponding to the respective satellite sets based on the evaluation points, and determines the selected present position candidate to be a present located position.

In the present position locating method according to this embodiment, the evaluation point calculation equation may be a composite function of at least one evaluation function selected from 1) an evaluation function with respect to the APR value, 2) an evaluation function with respect to a number of satellites included in the target satellite set, and 3) an evaluation function with respect to a DOP value of the constellation of the satellites included in the target satellite set, a plurality of evaluation functions corresponding to the average value of the APR values may be provided in advance for each of the evaluation functions 1) to 3); and the changing of the evaluation point calculation equation may include changing each evaluation function of the evaluation point calculation equation corresponding to the average value of the APR values.

In the positioning device according to this embodiment, the evaluation point calculation equation may be a composite function of at least one evaluation function selected from 1) an evaluation function with respect to the APR value, 2) an evaluation function with respect to a number of satellites included in the target satellite set, and 3) an evaluation function with respect to a DOP value of the constellation of the satellites included in the target satellite set, a plurality of evaluation functions corresponding to the average value of the APR values may be provided in advance for each of the evaluation functions 1) to 3); and the evaluation point calculation equation change section may change each evaluation function of the evaluation point calculation equation corresponding to the average value of the APR values.

According to the above configuration, the evaluation point calculation equation is a composite function of at least one evaluation function selected from 1) the evaluation function with respect to the APR value, 2) the evaluation function with respect to the number of satellites, and 3) the evaluation function with respect to the DOP value, and each evaluation function is changed corresponding to the average value of the APR values. This makes it possible to change the evaluation target corresponding to the reception environment (e.g., whether or not the reception environment is a multipath environment) and increase the evaluation point of the satellite set determined to have higher positioning accuracy so that the present position candidate corresponding to that satellite set is easily selected as the located position.

In the present position locating method according to this embodiment, a plurality of the evaluation point calculation equations may be provided in advance corresponding to the average value of the APR values; and the changing of the evaluation point calculation equation may include changing the evaluation point calculation equation corresponding to the average value of the APR values.

In the positioning device according to this embodiment, a plurality of the evaluation point calculation equations may be provided in advance corresponding to the average value of the APR values; and the evaluation point calculation equation change section may change the evaluation point calculation equation corresponding to the average value of the APR values.

According to the above configuration, a plurality of evaluation point calculation equations are provided in advance corresponding to the average value of the APR values, and the evaluation point is calculated using the evaluation point calculation equation corresponding to the average value of the APR values. Therefore, the evaluation point of each satellite set can be calculated corresponding to the reception environment (e.g., whether or not the reception environment is a multipath environment). As a result, a present position candidate determined to be the located position can be more appropriately selected.

Another embodiment of the invention relates to a computer-readable storage medium storing a program that causes a computer to execute the above present position locating method, the computer being included in a positioning device that receives satellite signals transmitted from positioning satellites and locates a present position of the positioning device based on the received satellite signals.

The term "storage medium" used herein refers to a storage medium (e.g., hard disk, CD-ROM, DVD, memory card, or IC memory) from which information stored therein can be read by a computer.

A further embodiment of the invention relates to an electronic instrument comprising the above positioning device.

Preferred embodiments of the invention are described in detail below with reference to the drawings.

The following embodiments illustrate specific preferred examples of the invention, and are provided with various technologically preferred limitations. Note that the scope of the invention is not limited to the following embodiments unless there is a description which limits the invention.

An embodiment in which the invention is applied to a portable telephone is described below with reference to the drawings.

Configuration

FIG. 1 is a block diagram showing the internal configuration of a portable telephone 1 (i.e., electronic instrument) according to this embodiment. As shown in FIG. 1, the portable telephone 1 includes a GPS antenna 10, a GPS receiver section 20 (positioning device), a host central processing unit (CPU) 40, an operation section 41, a display section 42, a read-only memory (ROM) 43, a random access memory (RAM) 44, a portable telephone antenna 50, and a portable telephone wireless communication circuit section 60.

The GPS antenna 10 is an antenna which receives an RF signal including a GPS satellite signal transmitted from a GPS satellite, and outputs the received RF signal.

The GPS receiver section 20 acquires/extracts the GPS satellite signal from the RF signal received by the GPS antenna 10, and calculates the present position by performing positioning calculations based on a navigation message and the like extracted from the GPS satellite signal. The GPS receiver section 20 includes a radio frequency (RF) receiver circuit section 21, an oscillation circuit 22, and a baseband process circuit section 30. The RF receiver circuit section 21 and the baseband process circuit section 30 may be produced as different large scale integrated (LSI) circuits, or may be produced in one chip.

The oscillation circuit 22 is a crystal oscillator or the like which generates and outputs an oscillation signal having a given oscillation frequency.

The RF receiver circuit section 21 multiplies the RF signal input from the GPS antenna 10 by a signal obtained by dividing or multiplying the frequency of the oscillation signal input from the oscillation circuit 22 to down-convert the RF signal into an intermediate-frequency signal (hereinafter referred to as "IF signal"). The RF receiver circuit section 21 amplifies the IF signal, converts the amplified signal into a digital signal using an A/D converter, and outputs the digital signal, for example.

The baseband process circuit section 30 is a circuit section which acquires/tracks the GPS satellite signal from the IF signal input from the RF receiver circuit section 21, and performs pseudo-range calculations, positioning calculations, and the like based on a navigation message, time information, and the like extracted by decoding data.

Specifically, the baseband process circuit section 30 acquires the GPS satellite signal based on the input IF signal. The baseband process circuit section 30 acquires the GPS satellite signal by extracting the GPS satellite signal from the IF signal by performing a correlation process on the IF signal. Specifically, the baseband process circuit section 30 performs a coherent process which calculates the correlation between the IF signal and a pseudo-generated C/A code replica (code replica) using FFT calculations, and an incoherent process which integrates the correlation values (i.e., the results of the coherent process) to calculate an integrated correlation value. As a result, the phases of the C/A code and a carrier frequency contained in the GPS satellite signal are obtained.

After acquiring the GPS satellite signal, the baseband process circuit section 30 tracks the acquired GPS satellite signal. The baseband process circuit section 30 tracks the GPS satellite signals by synchronously holding a plurality of acquired GPS satellite signals in parallel. For example, the baseband process circuit section 30 performs a code loop which is implemented by a delay locked loop (DLL) and tracks the phase of the C/A code, and a carrier loop which is implemented by a phase locked loop (PLL) and tracks the phase of the carrier frequency. The baseband process circuit section 30 extracts the navigation message by decoding data contained in each GPS satellite signal which has been tracked, and performs pseudo-range calculations, positioning calculations, and the like to locate the present position.

The baseband process circuit section 30 includes a CPU 31, a ROM 32, and a RAM 33. The baseband process circuit section 30 also includes various circuits such as a C/A code replica generation circuit, a correlation calculation circuit, and a data decoder circuit.

The CPU 31 controls each section of the baseband process circuit section 30 and the RF receiver circuit section 21, and performs various calculations including a baseband process described later.

In the baseband process, the CPU 31 calculates the pseudo-range between the portable telephone 1 and each acquired GPS satellite based on orbit information and time information relating to each GPS satellite included in the navigation message decoded from the acquired/tracked GPS satellite signal, and performs positioning calculations based on the calculated pseudo-range to calculate the present position of the portable telephone 1.

Figure 2:
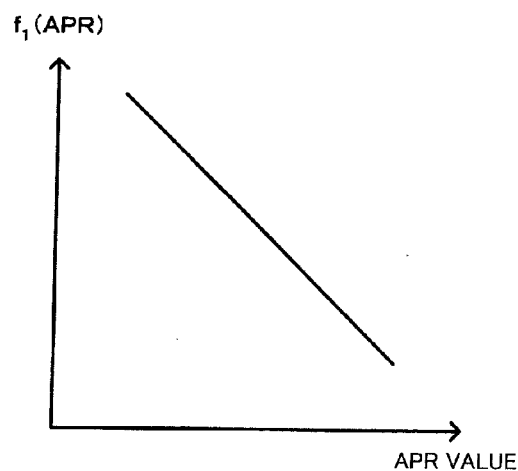
FIG. 2 is a graph showing an example of an evaluation function f1.

Specifically, the CPU 31 selects satellite sets (e.g., combinations of four or more GPS satellites) based on the acquired GPS satellite signals. For example, when eight GPS satellite signals have been acquired, the CPU 31 selects 163 (=8C8+8C7+8C6+8C5+8C4) satellite sets. The CPU 31 then performs positioning calculations corresponding to each selected satellite set using a least-square method or the like to calculate present position candidates P of the portable telephone 1. The CPU 31 then calculates an evaluation point E which indicates the positioning accuracy corresponding to each satellite set using an evaluation point calculation equation (1). The higher the evaluation point E, the higher the positioning accuracy is. The CPU 31 selects a satellite set with the highest evaluation point E from the satellite sets, and determines the present position candidate P corresponding to the selected satellite set to be the present located position of the portable telephone 1. Note that about several tens of satellite sets made up of six or more GPS satellites may be extracted from the satellite sets generated based on the acquired GPS satellite signals, and the located position of the portable telephone 1 may be determined based on the extracted satellite sets, for example.

$$E = k_1 \times f_1(APR) + k_2 \times f_2(PDOP) + k_3 \times f_3(\text{number of satellites}) \quad (1)$$

where, f1 is an evaluation function with respect to the a priori residual (APR) (APR value) of the target satellite set. FIG. 2 shows an example of the evaluation function f1. FIG. 2 shows a graph in which the horizontal axis indicates the APR value and the vertical axis indicates the evaluation function f1. As shown in FIG. 2, the larger the APR value, the smaller the evaluation function f1 is.

The a priori residual (APR) (APR value) of a satellite set is given by the following equation (2):

$$APR = \sum_{i}^{N} (ym_i - yp_i)^2 \quad (2)$$

where, N is the number of GPS satellites (number of satellites) included in the target satellite set, and i (=1, 2, ..., N) indicates the ith GPS satellite among the GPS satellites included in the target satellite set. $ym_i$ is the pseudo-range between the ith GPS satellite and the portable telephone 1. $yp_i$ is the distance (approximate distance) between the position ($X_i, Y_i, Z_i$) of the ith GPS satellite and the present position (x, y, z) of the portable telephone 1 obtained by positioning calculations, and is given by the following equation (3).

$$yp_i = \sqrt{(X_i - x)^2 + (Y_i - y)^2 + (Z_i - z)^2} \quad (3)$$

Specifically, the a priori residual (APR) is given as the sum of the square of the difference between the pseudo-range ym and the approximate distance yp of each GPS satellite of the target satellite set.

Figure 3:
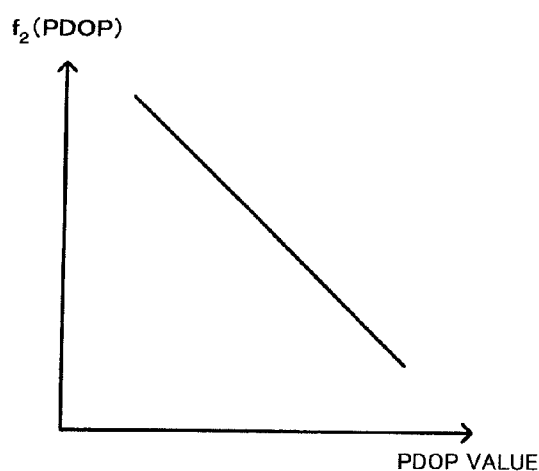
FIG. 3 is a graph showing an example of an evaluation function f2.

In the equation (1), f2 is an evaluation function with respect to the position dilution of precision (PDOP) of the target satellite set. FIG. 3 shows an example of the evaluation function f2. FIG. 3 shows a graph in which the horizontal axis indicates the PDOP value and the vertical axis indicates the evaluation function f2. The positioning accuracy generally increases as the PDOP value decreases. Therefore, the larger the PDOP value, the smaller the evaluation function f2 is.

Figure 4:
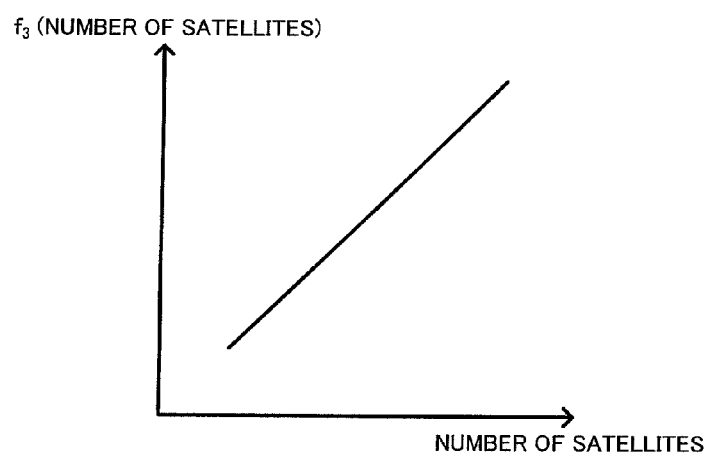
FIG. 4 is a graph showing an example of an evaluation function f3.

In the equation (1), f3 is an evaluation function with respect to the number of GPS satellites (number of satellites) included in the target satellite set. FIG. 4 shows an example of the evaluation function f3. FIG. 4 shows a graph in which the horizontal axis indicates the number of satellites and the vertical axis indicates the evaluation function f3. The positioning accuracy generally increases as the number of satellites increases. Therefore, the larger the number of satellites, the larger the evaluation function f3 is.

In the equation (1), k1 to k3 are coefficients (evaluation coefficients) for weighting the evaluation functions f1 to f3, respectively. Specifically, the evaluation coefficient k1 is a weighting coefficient for the evaluation function f1, the evaluation coefficient k2 is a weighting coefficient for the evaluation function f2, and the evaluation coefficient k3 is a weighting coefficient for the evaluation function f3. The evaluation coefficients k1 to k3 are determined corresponding to the average a priori residual (APR) (APR average value). The APR average value is the average value of the APR values of the generated satellite sets.

Figure 5:
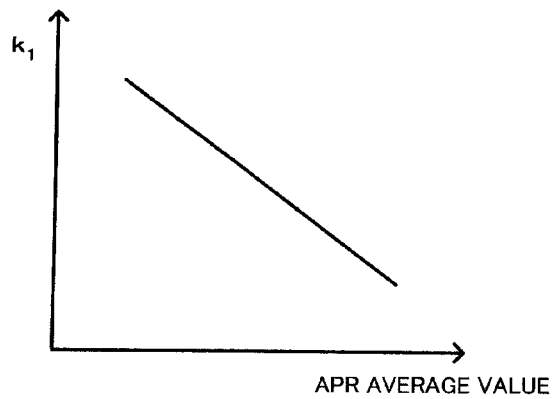
FIG. 5 is a graph showing an example of an evaluation coefficient k1.

FIG. 5 shows an example of the evaluation coefficient k1. FIG. 5 shows a graph in which the horizontal axis indicates the APR average value and the vertical axis indicates the evaluation coefficient k1. As shown in FIG. 5, the larger the APR average value, the smaller the evaluation coefficient k1 is.

Figure 6:
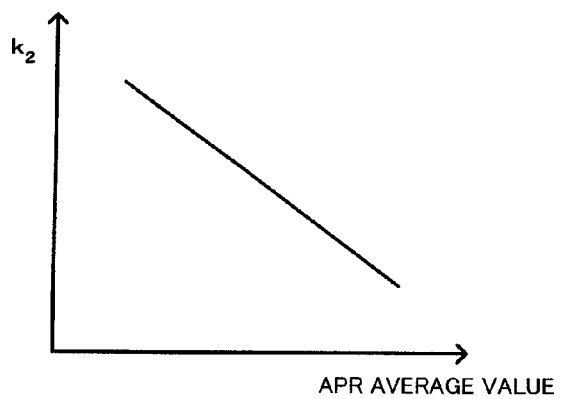
FIG. 6 is a graph showing an example of an evaluation coefficient k2.

FIG. 6 shows an example of the evaluation coefficient k2. FIG. 6 shows a graph in which the horizontal axis indicates the APR average value and the vertical axis indicates the evaluation coefficient k2. As shown in FIG. 6, the larger the APR average value, the smaller the evaluation coefficient k2 is.

Figure 7:
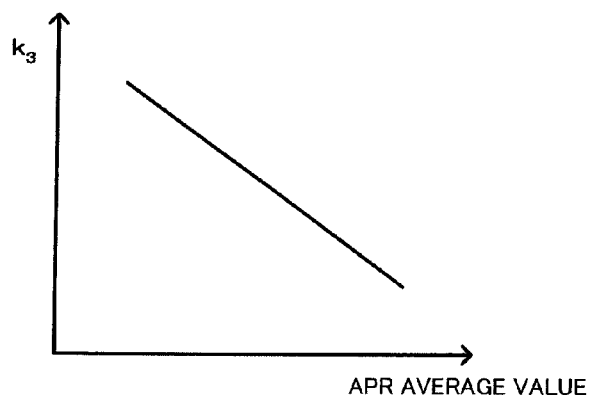
FIG. 7 is a graph showing an example of an evaluation coefficient k3.

FIG. 7 shows an example of the evaluation coefficient k3. FIG. 7 shows a graph in which the horizontal axis indicates the APR average value and the vertical axis indicates the evaluation coefficient k3. As shown in FIG. 7, the larger the APR average value, the smaller the evaluation coefficient k3.

FIGS. 8A and 8B show examples of experimental results indicating the relationship between the APR value and a positioning error. FIG. 8A shows experimental results in a multipath environment, and FIG. 8B shows experimental results in an open-sky environment. FIGS. 8A and 8B show positioning results at the same time in the respective reception environments provided that the present position of the portable telephone 1 is known.

As shown in FIG. 8A, seven GPS satellites (#1 to #7) are acquired in the multipath environment. FIG. 8A shows the APR values and the horizontal errors of seven satellite sets made up of six or more GPS satellites, and the APR average value and the average horizontal error of all the satellite sets. The term "horizontal error" refers to the horizontal difference between the known position of the portable telephone 1 and the present position calculated based on the GPS satellites of the target satellite set.

As shown in FIG. 8B, eight GPS satellites (#1, #2, #4, #6, and #8 to #11) are acquired in the open-sky environment. FIG. 8B shows the APR values and the horizontal errors of twenty satellite sets made up of six or more GPS satellites, and the APR average value and the average horizontal error of all the satellite sets.

When comparing the reception environments shown in FIGS. 8A and 8B, the APR value and the horizontal error are generally larger in the multipath environment as compared with the open-sky environment. Specifically, the larger the APR value, the larger the horizontal error (i.e., the lower the positioning accuracy) is. Therefore, it is desirable that the satellite set with a small APR value have a high evaluation point E so that the present position candidate corresponding to the satellite set with a small APR value is preferentially selected. Accordingly, the evaluation function f1 is set to increase as the APR value decreases, as shown in FIG. 2.

When comparing the reception environments shown in FIGS. 8A and 8B, the APR value of each satellite is generally large in the multipath environment and is small in the open-sky environment. However, this does not necessarily apply to the individual satellite sets. Specifically, the APR value may be small even in the multipath environment, and may be large even in the open-sky environment. In FIGS. 8A and 8B, the third satellite set (#1, #2, #3, #5, #6, and #7) in the multipath environment has a small APR value, and the second satellite set (#1, #2, #4, #6, #8, #9, #10, and #11) in the open-sky environment has a large APR value, for example. However, the reception environment can be almost reliably determined based on the APR average value. Specifically, the reception environment is likely to be the multipath environment when the APR average value is large, and is likely to be the open-sky environment when the APR average value is small.

As described above, a position is likely to be located using a GPS satellite signal with poor accuracy in the multipath environment, and the positioning accuracy is likely to be poor even if the APR value is small. Accordingly, the coefficient k1 for weighting the evaluation function f1 is set to decrease as the APR average value increases, as shown in FIG. 5, so that the evaluation function f1 with respect to the APR value is weighted to a small extent in the multipath environment.

The positioning accuracy generally increases as the number of satellites increases. However, a GPS satellite affected by a multipath is likely to be included in the satellite set with a larger number of satellites in the multipath environment so that the positioning accuracy may be poor. Accordingly, the coefficient k3 for weighting the evaluation function f3 is set to decrease as the APR average value increases, as shown in FIG. 7, so that the evaluation function f3 with respect to the number of satellites is weighted to a small extent in the multipath environment.

The positioning accuracy generally increases as the PDOP value decreases. The PDOP value generally decreases as the number of satellites increases. However, a position is likely to be located using a GPS satellite signal with poor accuracy in the multipath environment, and the positioning accuracy is likely to be poor even if the PDOP value is small since the number of satellites is large. Accordingly, the coefficient k2 for weighting the evaluation function f2 is set to decrease as the APR average value increases, as shown in FIG. 6, so that the evaluation function f2 with respect to the PDOP value is weighted to a small extent in the multipath environment.

Again referring to FIG. 1, the ROM 32 stores a system program which causes the CPU 31 to control each section of the baseband process circuit section 30 and the RF receiver circuit section 21, and a program and data necessary for the CPU 31 to implement various processes including the baseband process. FIG. 9 is a view showing the configuration of the ROM 32. As shown in FIG. 9, the ROM 32 stores a baseband process program 321, evaluation function equation data 322, and evaluation coefficient calculation equation data 323. The evaluation function equation data 322 is data which defines the evaluation functions f1 to f3. For example, the function equations of the graphs shown in FIGS. 2 to 4 are stored as the evaluation function equation data 322. The evaluation coefficient calculation equation data 323 is data which defines the evaluation coefficients k1 to k3. For example, the function equations of the graphs shown in FIGS. 5 to 7 are stored as the evaluation coefficient calculation equation data 323.

The RAM 33 is used as a work area for the CPU 31, and temporarily stores a program and data read from the ROM 32, results of calculations performed by the CPU 31 based on various programs, and the like. FIG. 10 shows an example of the configuration of the RAM 33. As shown in FIG. 10, the RAM 33 stores satellite position data 331, satellite set data 332, and evaluation point calculation data 333.

FIG. 11 is a view showing an example of the data configuration of the satellite position data 331. As shown in FIG. 11, a position 331b calculated based on the GPS satellite signal is stored as the satellite position data 331 corresponding to each GPS satellite 331a acquired.

The satellite set data 332 is data relating to the satellite set generated based on the acquired GPS satellite signals. FIG. 12 shows an example of the data configuration of the satellite set data 332. As shown in FIG. 12, a GPS satellite 332b included in the satellite set, a number of satellites 332c, a present position candidate 332d, an APR value 332e, a PDOP value 332f, and an evaluation point 332g are stored as the satellite set data 332 corresponding to each satellite set 332a generated.

The evaluation point calculation data 333 is data used to calculate the evaluation point E of each satellite set. FIG. 13 is a view showing an example of the data configuration of the evaluation point calculation data 333. As shown in FIG. 13, an APR average value 333a and evaluation coefficients 333b to 333d (k1 to k3) are stored as the evaluation point calculation data 333.

The host CPU 40 controls each section of the portable telephone 1 based on various programs such as a system program stored in the ROM 43. Specifically, the host CPU 40 mainly implements a telephone call function, and performs a process for implementing various functions including a navigation function such as causing the display section 42 to display a navigation screen in which the present position of the portable telephone 1 input from the baseband process circuit section 30 is plotted on a map.

The operation section 41 is an input device including an operation key, a button switch, and the like. The operation section 41 outputs an operation signal corresponding to the operation of the user to the host CPU 40. Various instructions such as a positioning start/finish instruction are input by operating the operation section 41. The display section 42 is a display device such as a liquid crystal display (LCD). The display section 42 displays a display screen (e.g., navigation screen and time information) based on a display signal input from the host CPU 40.

The ROM 43 stores a system program which causes the host CPU 40 to control the portable telephone 1, a program and data necessary for implementing a navigation function, and the like. The RAM 44 is used as a work area for the host CPU 40. The RAM 44 temporarily stores a program and data read from the ROM 43, data input from the operation section 41, results of calculations performed by the host CPU 40 based on various programs, and the like.

The portable telephone antenna 50 is an antenna which transmits and receives a portable telephone radio signal between the portable telephone 1 and a radio base station installed by a communication service provider of the portable telephone 1. The portable telephone wireless communication circuit section 60 is a portable telephone communication circuit section which includes an RF conversion circuit, a baseband process circuit, and the like, and transmits and receives a radio signal under control of the host CPU 40.

Process Flow

Figure 14:
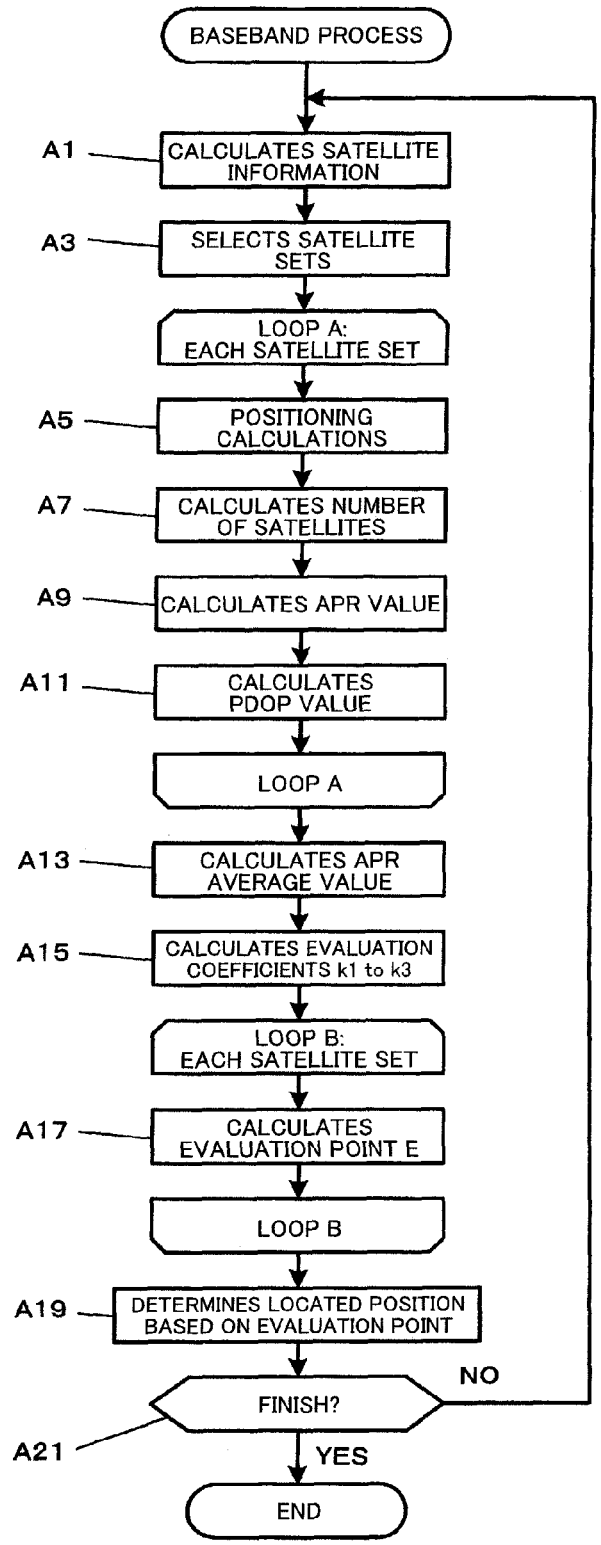
FIG. 14 is a flowchart of a baseband process.

FIG. 14 is a flowchart illustrative of the flow of the baseband process executed by the CPU 31. The baseband process is implemented by causing the CPU 31 to execute the baseband process program 321. A digital IF signal obtained by down-converting an RF signal received by the GPS antenna 10 into an IF signal by the RF receiver circuit section 21 is input to the baseband process circuit section 30 at any time before the baseband process.

As shown in FIG. 14, the CPU 31 calculates satellite information (including the position) relating to each GPS satellite based on the acquired GPS satellite signal (step A1). The CPU 31 selects satellite sets made up of four or more GPS satellites based on the acquired satellite signals (step A3), and performs a loop A process on each selected satellite set. In the loop A, the CPU 31 calculates the present position candidate of the portable telephone 1 by performing positioning calculations using a least-square method or the like based on the position of each GPS satellite of the target satellite set (step A5). The CPU 31 calculates the number of GPS satellites (number of satellites) included in the target satellite set (step A7). The CPU 31 calculates the APR value of the target satellite set based on the calculated present position candidate (step A9), and calculates the PDOP value of the target satellite set (step A11). The loop A is thus performed.

When the CPU 31 has performed the loop A process on all satellite sets, the CPU 31 calculates the APR average value of the satellite sets (step A13). The CPU 31 calculates the evaluation coefficients k1 to k3 based on the calculated APR average value (step A15). The CPU 31 then performs a loop B process on each satellite set generated. In the loop B, the CPU 31 calculates the evaluation point E of the target satellite set. Specifically, the CPU 31 calculates the evaluation functions f1 to f3 based on the APR value, the PDOP value, and the number of satellites of the target satellite set, and calculates the evaluation point E based on the calculated evaluation functions f1 to f3 and the evaluation coefficients k1 to k3 according to the equation (1) (step A17). The loop B is thus performed.

When the CPU 31 has performed the loop B process on all satellite sets, the CPU 31 selects the satellite set with the highest evaluation point E from the satellite sets, and determines the present position candidate corresponding to the selected satellite set to be the present located position (step A19). The CPU 31 then determines whether or not to finish positioning. When the CPU 31 has determined to continue positioning (step A21: NO), the CPU 31 returns to the step A1 and performs the next positioning. When the CPU 31 has determined to finish positioning (step A21: YES), the CPU 31 finishes the baseband process.

Modification

Embodiments to which the invention may be applied are not limited to the above-described embodiments. Various modifications and variations may be made without departing from the spirit and scope of the invention.

(A) Evaluation Functions f1 to f3

In the above embodiments, the evaluation coefficients k1 to k3 for weighting the evaluation functions f1 to f3 are changed corresponding to the APR average value. Note that a plurality of functions may be defined for each of the evaluation functions f1 to f3, and the function applied may be changed corresponding to the APR average value.

Figure 15A:
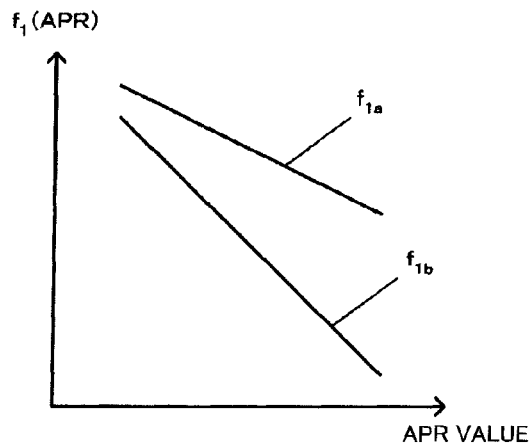
FIGS. 15A to 15C show modifications of the evaluation functions f1 to f3.
Figure 15B:
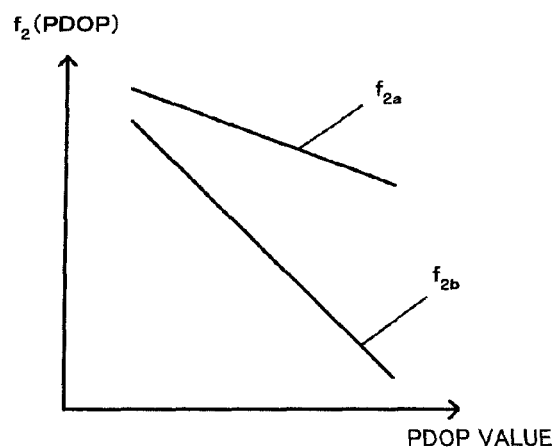
Figure 15C:
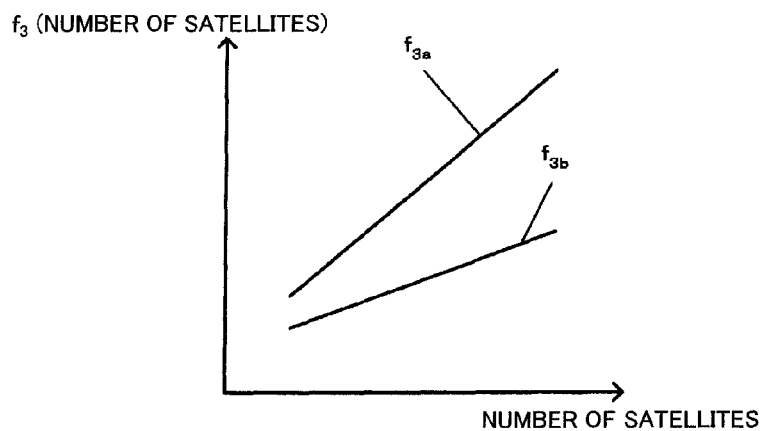

For example, two functions fa and fb associated with the APR average value are defined for each of the evaluation functions f1 to f3, as shown in FIGS. 15A to 15C. FIG. 15A shows evaluation functions f1a and f1b with respect to the APR value, FIG. 15B shows evaluation functions f2a and f2b with respect to the PDOP value, and FIG. 15C shows evaluation functions f3a and f3b with respect to the number of satellites. For example, the functions f1a, f2a, and f3a are respectively used as the evaluation functions f1, f2, and f3 when the APR average value is less than a given threshold value, and the functions f1b, f2b, and f3b are respectively used as the evaluation functions f1, f2, and f3 when the APR average value is equal to or larger than a given threshold value.

(B) Evaluation Point Calculation Equation

A plurality of calculation equations may be defined as the evaluation point calculation equation, and the calculation equation applied may be changed corresponding to the ARP average value.

(C) Evaluation Function f

In the above embodiments, the evaluation functions f1 to f3 with respect to the APR value, the PDOP value, and the number of satellites are used for the evaluation point calculation equation. Note that one or two of the evaluation functions f1 to f3 may be used, or an evaluation function with respect to another evaluation target (e.g., position sigma or signal strength) may also be used.

(D) Host CPU

Some or all of the processes performed by the CPU 31 of the baseband process circuit section 30 may be performed by the host CPU 40 by means of software.

(E) Positioning Device

The above embodiments have been described taking an example of a portable telephone which is an electronic instrument including a positioning device. Note that the invention may also be applied to other electronic instruments such as a portable navigation system, a car navigation system, a personal digital assistant (PDA), and a wristwatch.

(F) Satellite Positioning System

The above embodiments have been described taking an example utilizing the GPS. Note that the invention may also be applied to other satellite positioning systems such as the global navigation satellite system (GLONASS).

(G) Storage Medium

A configuration may be employed in which the baseband process program 321 is recorded on a storage medium such as a CD-ROM and installed in an electronic instrument such as a portable telephone.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning method comprising:
generating a plurality of satellite sets, each of the plurality of satellite sets being a combination of positioning satellites used for a present positioning process;
computing a candidate position with respect to each of the plurality of satellite sets;
obtaining an A Priori Residual (APR) with respect to each of the plurality of satellite sets based on the candidate position and locations of the positioning satellites;
obtaining an averaged APR by averaging the APR thus obtained;
changing a weighting of an evaluation function based on the averaged APR;
calculating an evaluation point of the candidate position by calculating a scoring equation to which the weighting of the evaluation function is applied; and
determining a present position based on the evaluation point.

2. The positioning method according to claim 1, wherein the weighting is changed so that the weighting is lower as the averaged APR rises.

3. The positioning method according to claim 1, wherein the evaluation function is selected from a plurality of evaluation functions, and
the plurality of evaluation functions corresponding to a range of averaged APRs.

4. A positioning method comprising:
generating a plurality of satellite sets, each of the plurality of satellite sets being a combination of positioning satellites used for a present positioning process;
computing a candidate position with respect to each of the plurality of satellite sets;

obtaining an A Priori Residual (APR) with respect to each of the plurality of satellite sets based on the candidate position and locations of the positioning satellites;

obtaining an averaged APR by averaging the APR thus obtained;

modifying a scoring equation based on the averaged APR;

calculating an evaluation point of the candidate position by calculating the scoring equation; and determining a present position based on the evaluation point.

5. The positioning method according to claim 4, wherein the scoring equation is selected from a plurality of scoring equations, and the plurality of scoring equations corresponding to a range of averaged APRs.

* * * * *